US012715099B2

(12) United States Patent
White et al.

(10) Patent No.: US 12,715,099 B2
(45) Date of Patent: Aug. 25, 2026

(54) ELECTRIC DEVICE WITH AT LEAST ONE TABLESS BATTERY CELL

(71) Applicant: Robert Bosch GmbH, Stuttgart (DE)

(72) Inventors: Daniel White, Bettendorf, IA (US); James Knea, Arlington Heights, IL (US); Robert Bonasewicz, Mt. Prospect, IL (US); Joseph Scaduto, Hawthorn Woods, IL (US); Audel Gutierrez, Aurora, IL (US); Ralph Kramarski, Inverness, IL (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 19/269,272

(22) Filed: Jul. 15, 2025

(65) Prior Publication Data

US 2026/0027692 A1 Jan. 29, 2026

Related U.S. Application Data

(60) Provisional application No. 63/676,520, filed on Jul. 29, 2024.

(51) Int. Cl.

| | |
|---|---|
| ***B25F 5/00*** | (2006.01) |
| ***H01M 50/242*** | (2021.01) |
| ***H01M 50/247*** | (2021.01) |
| ***H02K 5/22*** | (2006.01) |
| ***H02K 5/24*** | (2006.01) |
| ***H02K 7/14*** | (2006.01) |
| ***H02K 11/00*** | (2016.01) |
| ***H02K 11/33*** | (2016.01) |

(52) U.S. Cl.

CPC .......... *B25F 5/006* (2013.01); *H01M 50/242* (2021.01); *H01M 50/247* (2021.01); *H02K 5/225* (2013.01); *H02K 5/24* (2013.01); *H02K 7/145* (2013.01); *H02K 11/0094* (2013.01); *H02K 11/33* (2016.01); *H01M 2220/30* (2013.01); *H02K 2211/03* (2013.01)

(58) Field of Classification Search

CPC .... H02K 11/33; H02K 7/145; H02K 11/0094; H02K 21/16; H02K 9/06; H02K 2203/09; H02K 3/522; H02K 5/207; H02K 2213/03

USPC ........................................................ 310/68, 50

See application file for complete search history.

(56) References Cited

U.S. PATENT DOCUMENTS

| | | | | |
|---|---|---|---|---|
| 9,774,229 | B1 | 9/2017 | Mergener et al. | |
| 11,431,224 | B2 | 8/2022 | French, Jr. et al. | |
| 11,749,842 | B2 * | 9/2023 | Tsuruta ............ | H01M 10/0431 429/94 |

(Continued)

FOREIGN PATENT DOCUMENTS

| | | | |
|---|---|---|---|
| WO | 2023/130135 | A1 | 7/2023 |
| WO | 2023/192839 | A1 | 10/2023 |

*Primary Examiner* — Jacob A Smith

(74) *Attorney, Agent, or Firm* — Maginot, Moore & Beck LLP

(57) ABSTRACT

An electric device includes a housing, an electromechanical assembly housed within the housing, a battery arranged within the housing and comprising at least one tabless battery cell, and at least one connector that is electrically coupled to the electromechanical assembly and the battery so as to electrically connect the electromechanical assembly and the battery. The at least one connector is mechanically decoupled from at least one of the electromechanical assembly and the battery.

20 Claims, 5 Drawing Sheets

(56) References Cited

U.S. PATENT DOCUMENTS

| | | | | |
|---|---|---|---|---|
| 2010/0183910 | A1* | 7/2010 | Nishino | H01M 10/0431 429/163 |
| 2021/0028671 | A1* | 1/2021 | Chung | H02K 11/33 |
| 2023/0021944 | A1* | 1/2023 | Petrus | B25F 5/006 |
| 2023/0402722 | A1* | 12/2023 | Eggleston | H01M 50/533 |

* cited by examiner

ELECTRIC DEVICE WITH AT LEAST ONE TABLESS BATTERY CELL

This application claims priority to U.S. Provisional Application Ser. No. 63/676,520 entitled "Electric Device With At Least One Tabless Battery Cell" filed on Jul. 29, 2024, the disclosure of which is incorporated herein by reference in its entirety.

FIELD

This disclosure relates generally to electric devices, and, more particularly, to electric devices with a battery having at least one tabless cell.

BACKGROUND

Users of electronic devices, for example handheld power tools, rotary tools, string trimmers, vacuums, flashlights, shavers and beard trimmers, cordless steam mops, cordless irons, camping heaters, and battery to AC inverters prefer that the electric device is smaller and more comfortable to operate. Users also want to have sufficient performance in the smaller package so the job or task at hand can be done efficiently and swiftly. The battery of the electronic device is commonly one of the largest components, and it is also frequently the heaviest component. Further, the battery is often one of the largest contributors to the resistance of the system, thus having a large influence over the power output of the electronic device. Accordingly, smaller and lighter batteries that have lower resistance are advantageous to improve the ergonomics of electronic devices.

The size of the batteries can be reduced in two ways: by using fewer of the conventional cells with the same electronic device runtime and charge time or cells with different form factors from the traditional cells, or by using fewer cells, resulting in shorter runtime, but significantly faster charge rate, and thereby reducing the amount of downtime that the user feels when the tool discharges. Using fewer cells while still maintaining the performance characteristics means the system will be exposed to increased electrical current. Since power loss to heat is proportional to the square of the system resistance ($P=I^2R$), the increase in increased electrical current produces additional heat in the system. As product sizes decrease, maintaining the performance of the tool necessitates added attention to every location that produces electrical resistance.

One area that has historically created electrical resistance is the power connections between the battery and the product. Often this resistance grows over time reducing the performance of the tool and ultimately reducing the life of the tool.

Conventional power tools include one or more conventional battery cells 10, shown in FIG. 1, having a tabbed electrode configuration. The tabbed electrode configuration includes a positive electrode or cathode 18 and a negative electrode or anode 22 that are separated from one another by one or more separators 24. The positive electrode 18 includes a positive tab 26 protruding from one end of the battery cell 10, while the negative electrode 22 includes a negative tab 30 protruding from the opposite end of the battery cell 10. As seen in the schematic view of FIG. 2, the tabs 26, 30 have a reduced cross-sectional area compared to the remainder of the electrodes 18, 22. Further, the current must travel along the entire length of the wound electrode 18, 22. As a result, the tabbed electrode configuration has a relatively large internal resistance, which causes a limited current capacity. Because of this, the power output of a tabbed battery cell is limited.

Further, in some configurations, the battery cells are mounted rigidly in the electronic device housing and the batteries include rigid electrical and mechanical connections to the electronics of the device. The battery, regardless of its cell count or cell format, has a mass that causes it to resonate when a vibration acts on it. The tool in which the electrical current is received through a connection also has a mass, which is frequently different than the mass of the battery. Because of the mass differences, the battery and the tool may resonate at different frequencies than the frequency with which the tool vibrates. The different frequencies result in the battery and the tool moving relative to one another during operation. Specifically, vibrations of the housing cause the rigid connections to vibrate, which may result in fretting of the rigid connections. Over time, this fretting can increase the resistance at the connection, which can result in increased power loss through heating and premature failure of the rigid connections. What is needed, therefore, are improvements in batteries and battery connections in electric devices to increase the robustness of the connections and enable high current transfer.

SUMMARY

In one embodiment, the disclosure describes an electric device that includes a housing, an electromechanical assembly housed within the housing, a battery arranged within the housing and comprising at least one tabless battery cell, and at least one connector that is electrically coupled to the electromechanical assembly and the battery so as to electrically connect the electromechanical assembly and the battery. The at least one connector is mechanically decoupled from at least one of the electromechanical assembly and the battery.

In another embodiment, a power tool includes a housing, an output shaft configured to receive a working tool, and an electromechanical assembly housed within the housing. The electromechanical assembly including a motor configured to rotate the output shaft. The power tool further includes a battery arranged integrally within the housing and comprising at least one tabless battery cell, and at least one connector that is electrically coupled to the electromechanical assembly and the battery so as to electrically connect the electromechanical assembly and the battery. The at least one connector is mechanically decoupled from at least one of the electromechanical assembly and the battery.

In a further embodiment of the disclosure, a rotary tool includes an elongated housing having a longitudinal axis defined by a main extent direction of the elongated housing, an output shaft configured to receive a working tool, an electromechanical assembly housed within the housing, a battery arranged integrally within the housing and comprising at least one tabless battery cell, and at least one connector that is permanently electrically coupled to the electromechanical assembly and to the battery so as to electrically connect the electromechanical assembly and the battery. The electromechanical assembly includes a motor configured to directly drive the output shaft in rotation, and a circuit board configured to control operation of the motor. The at least one connector is mechanically decoupled from at least one of the electromechanical assembly and the battery, and the at least one connector is electrically coupled to and mechanically decoupled from the at least one of the electromechanical assembly and the battery via at least one first flexible wire.

DETAILED DESCRIPTION

Figure 1:
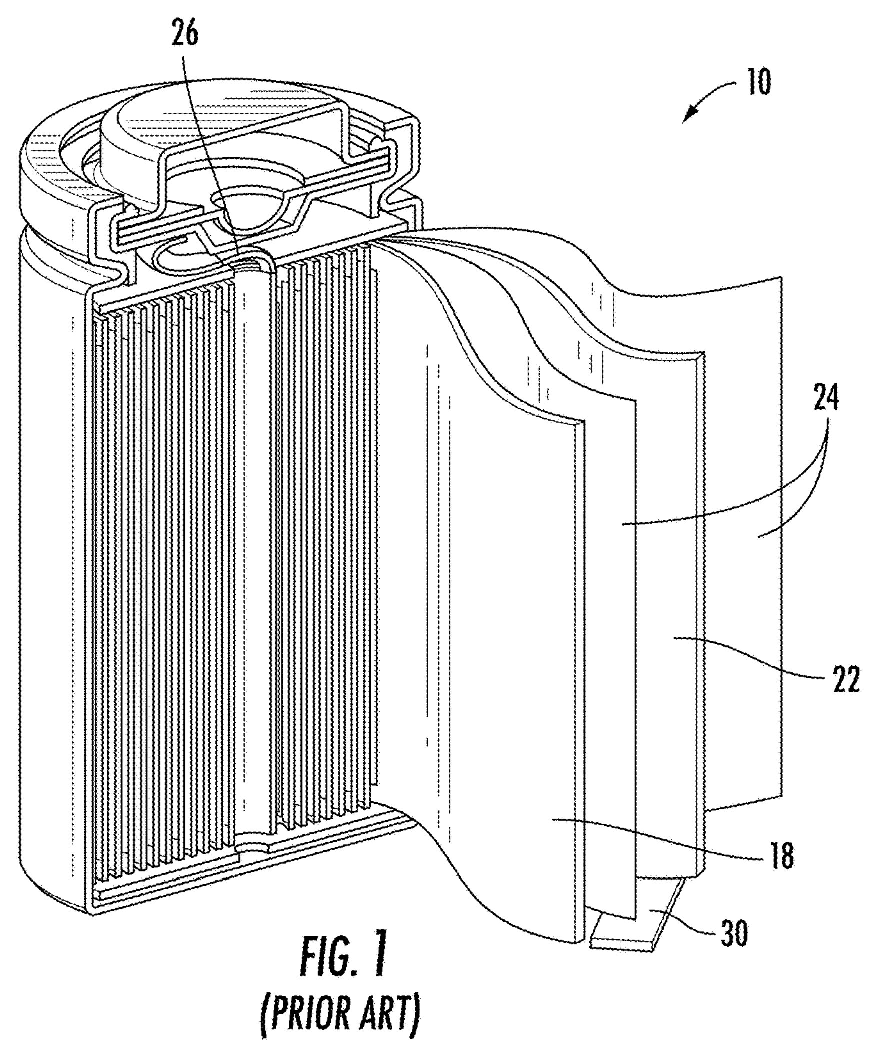
FIG. 1 is a cutaway view of a conventional battery cell.

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

FIGS. 3-6 depict an electric device 100, shown as a battery-operated handheld power tool, specifically a battery-operated handheld rotary tool, having an improved battery configuration according to the disclosure. The electric device 100 includes an electromechanical assembly 104, a battery 108, and a housing 112 in which the electromechanical assembly 104 and the battery 108 are housed. In the illustrated embodiment, the housing 112 is configured as an elongated housing that is designed to be gripped in one hand by a user.

The electromechanical assembly 104 includes one or more circuit boards 116, one of which is shown in the illustrated embodiment, and a motor 120 operably connected to an output shaft 124 of the tool, which is connected to a tool holder 126 that receives a working tool (not shown). The circuit board 116 is operably connected to a power switch 128 and a motor speed control dial 132. The circuit board 116 is configured to control operation of the motor 120 based on the inputs from the power switch 128 and the motor speed control dial 132 to rotate the output shaft 124 at the selected rotational speed. The output shaft 124 has an output axis 134 that extends along a longitudinal axis 136 defined by the main extent direction of the housing 112. In particular, in the illustrated embodiment of the rotary tool, the output shaft 124 is coaxial with the motor 120 and is directly driven by the motor 120 such that the output shaft 124 is mechanically coupled to the motor 120 without a transmission or other gearing interposed between the motor 120 and the output shaft 124.

The battery 108 includes at least one battery cell 140, two of which are shown in the illustrated embodiment. Each of the battery cells 140 is configured as a tabless battery cell. Specifically, as used herein, a "tabless" battery cell is one in which the battery electrodes do not include a tab projecting from the current collector side of the electrodes. The battery cells 140 each have a positive terminal 146 and a negative terminal 150. One or more of the terminals 146, 150 of the battery cells 140 may be connected terminals 146, 150 of another battery cell 140 in the battery 108 either in series or in parallel such that the battery 108 has a greater output voltage and/or output current than a single one of the battery cells 140.

Figure 7:
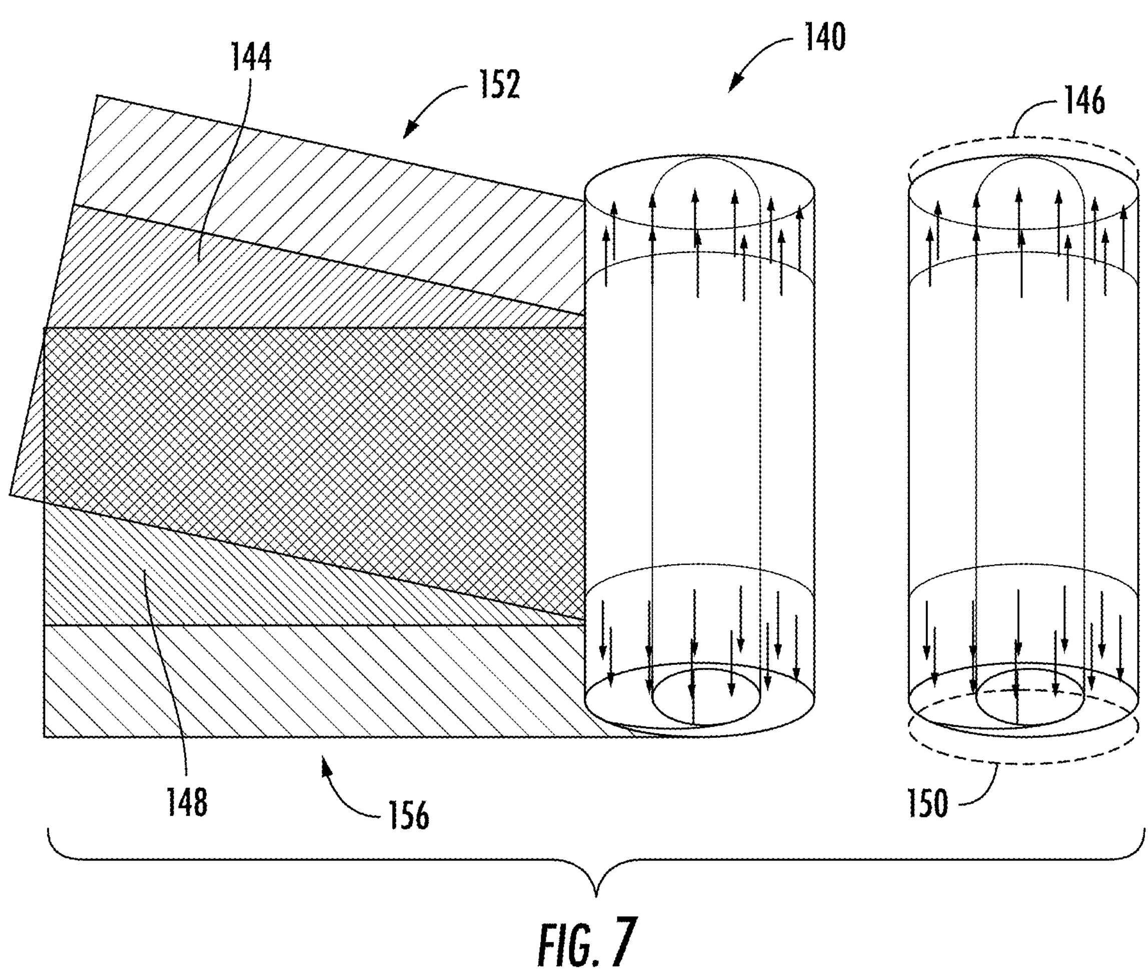
FIG. 7 is a schematic view of the battery cell of the electric device of FIG. 3.
Figure 8:
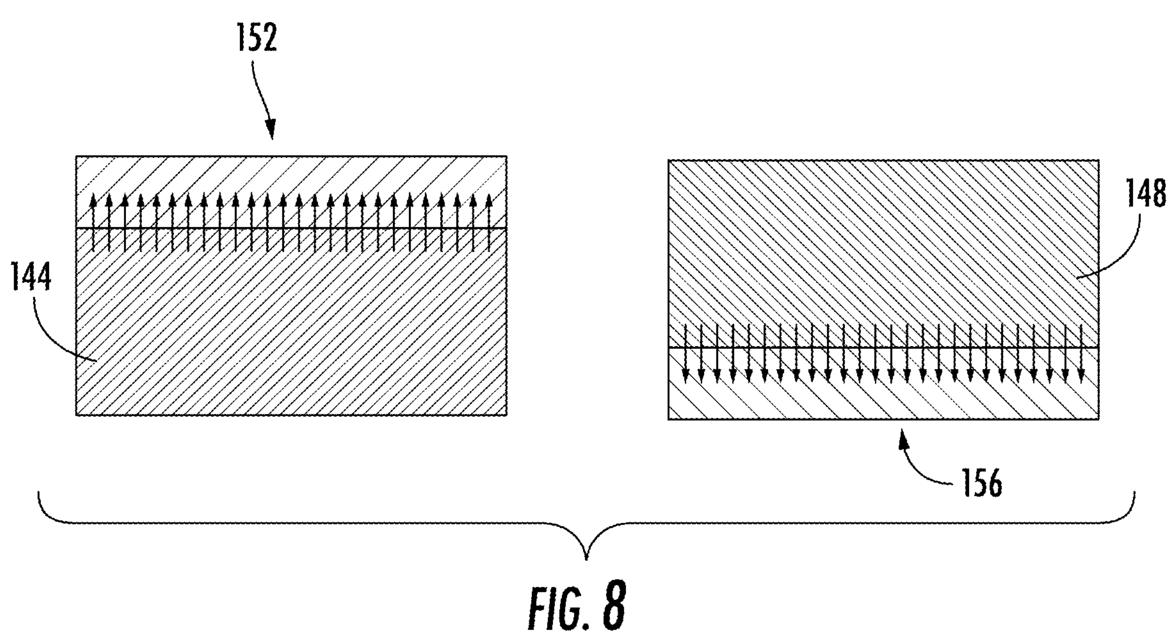
FIG. 8 is a schematic view of the electrodes of the battery cell of the electric device of FIG. 3.

The configuration of the tabless battery cells 140 is shown in FIGS. 7 and 8. Specifically, each of the tabless battery cells 140 includes a positive electrode or cathode 144 electrically connected to the positive terminal 146 and a negative electrode or anode 148 electrically connected to the negative terminal 150. The positive and negative electrodes 144, 148 are wound around each other in a jelly-roll configuration and separated from one another by at least one separator that is wound between the two electrodes 144, 148. The reader should appreciate that, as an alternative to the jelly-roll configuration, the battery cells 140 may be arranged with a stacked configuration such that layers of positive and negative electrodes and separators are stacked on top of one another, or in another desired configuration. Each of the electrodes 144, 148 is configured such that its respective long side 152, 156, i.e. the side facing toward the associated terminal 146, 150, collects the current from within the respective electrode 144, 148. As such, the entire side 152, 156 of the electrodes 144, 148 functions as a current collector, and the entire length of each of the sides 152, 156 is in contact with the respective terminal 146, 150.

Figure 2:
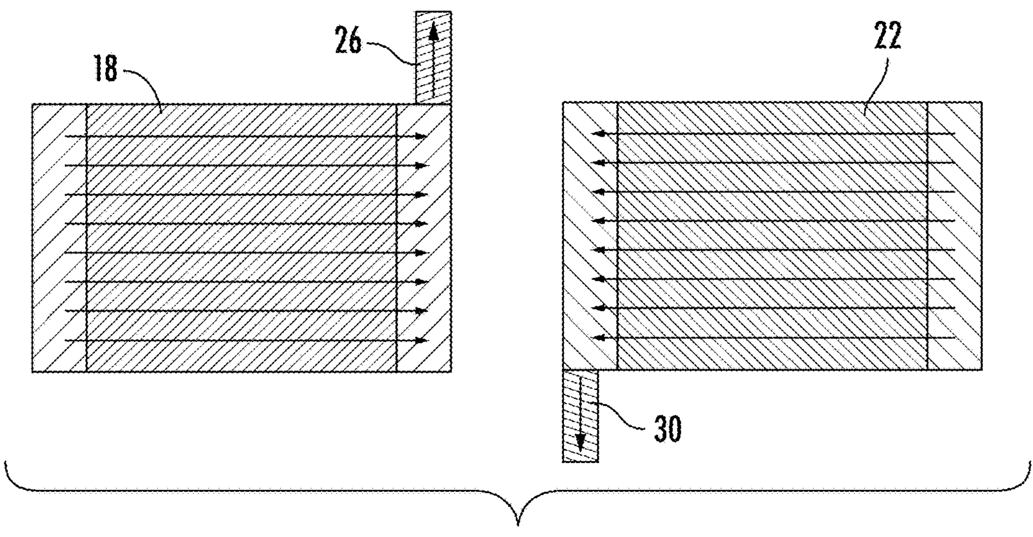
FIG. 2 is a schematic view of the electrodes of the conventional battery cell of FIG. 1.

The internal current in each of the electrodes 144, 148 runs from the electrode 144, 148 to the associated terminal 146, 150. Therefore, as is best seen in FIG. 8, the internal current path in each of the electrodes 144, 148 runs in the direction generally parallel to the shortest side of the electrodes 144, 148 or, in terms of the battery cell 140, along the length of the battery cell 140 defined from one terminal toward the opposite terminal. The longest distance of current travel within each electrode 144, 148 is therefore from the side opposite the current collecting side 152, 156, to the current collecting side 152, 156 in a direction perpendicular to the side. As such, in comparison with the tabbed battery (see FIG. 1) in which the longest current travel path extends along the wound length of the electrode, the internal current paths of the tabless battery cell 140 are considerably shorter. This results in simpler intercalation of the ions from the lithium anode or electrode active material (e.g. composite). Further, since the entire side 152, 156 of the electrodes 144, 148 functions as the current collector, the current within the tabless battery cell 140 is not bottlenecked in a tab (c.f. FIGS. 1 and 2), and therefore the tabless battery cells 140 has low resistance compared to the conventional battery cell discussed above.

Further, because of the low internal resistance of the tabless battery cells 140, the electric device 100 can be discharged and charged at a faster rate than conventional tabbed battery cell. This high discharge rate enables the electric device to deliver the same power at a lower voltage, which results in fewer battery cells 140 being necessary to provide the desired power output. Consequently, the electric device can be a smaller, lighter, and lower cost device. In addition, the high charge rate enables the battery cells 140 to be charged faster, which reduces the downtime required after the batteries are discharged.

Additionally, referring back to FIGS. 3-6, the battery 108 is internal to the housing 112 and is arranged integrally in the housing 112. In particular, as used herein, the battery being arranged "integrally" in the housing 112 means that the battery 108 is installed in the housing such that it is recharged without being removed from the housing 112, and the battery cannot be uninstalled from the housing 112 without disassembling the housing 112 in a manner inconsistent with normal use of the electric device 100. For example, the electric device 100 is not configured such that the battery 108 is removable in the manner of a conventional removable battery pack or disposable batteries, though the battery 108 may be capable of being serviced by disassembling the housing 112 in the rare event of battery failure.

The battery 108, and specifically the battery cells 140, may be mechanically decoupled from the housing 112 such that vibrations from the housing 112 are not directly transferred to the battery cells 140. In one embodiment, the battery 108 is mounted by one or more resilient members 158, for example foam or rubber pads, that damp the vibrations of the housing 112. The resilient members 158 allow for relative motion between the battery 108 and the housing 112 so as to reduce the transfer of vibrations, which can degrade performance of the battery 108, between the housing 112 and the battery.

Figure 3:
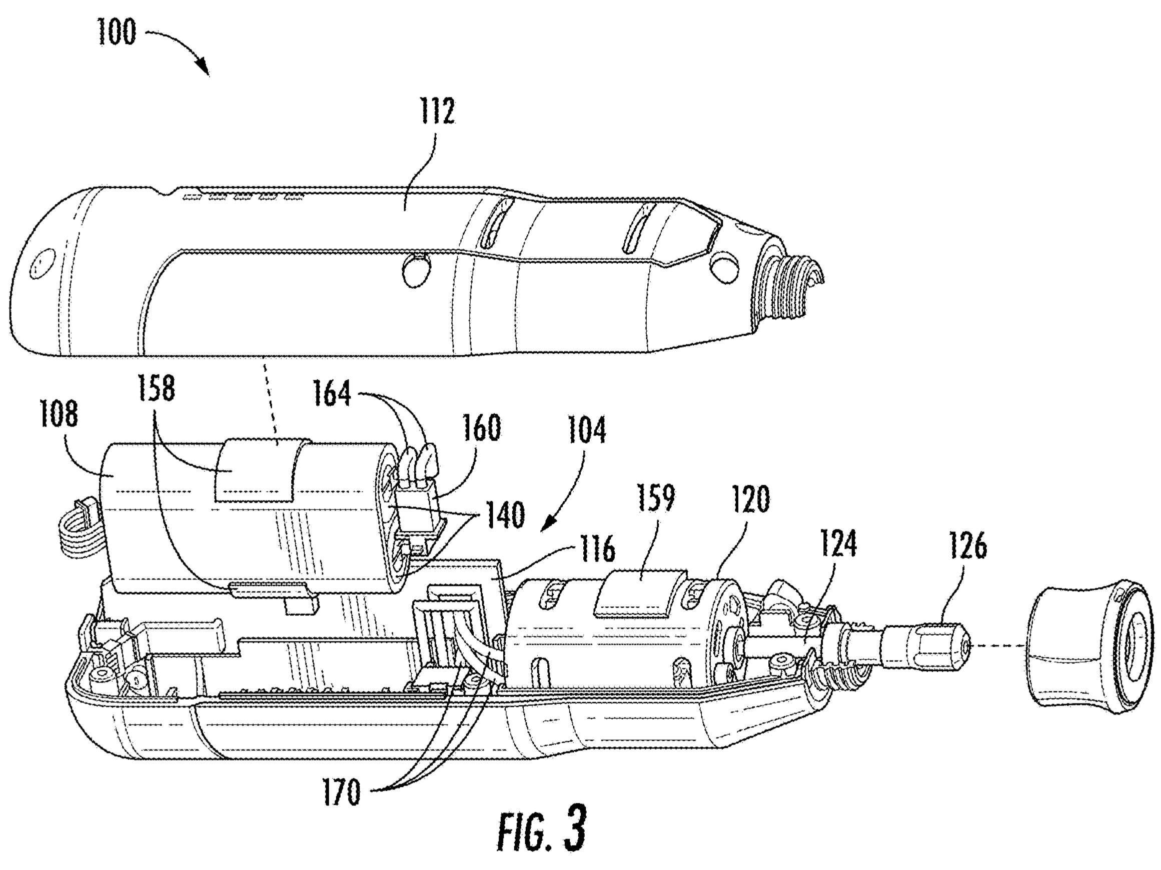
FIG. 3 is a partially exploded side perspective view of an electric device according to the disclosure.
Figure 4:
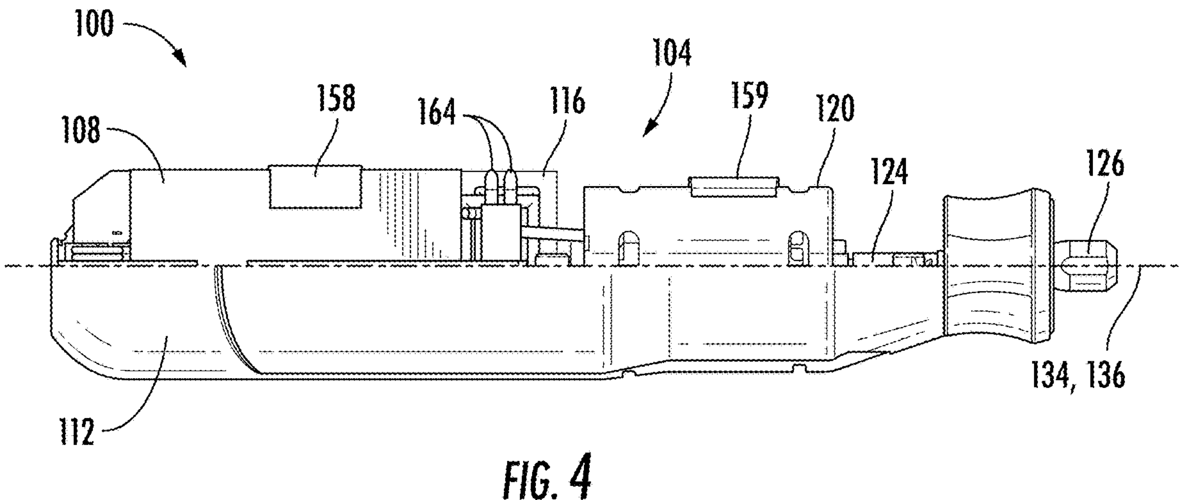
FIG. 4 is a side partial cutaway view of the electric device of FIG. 3.
Figure 5:
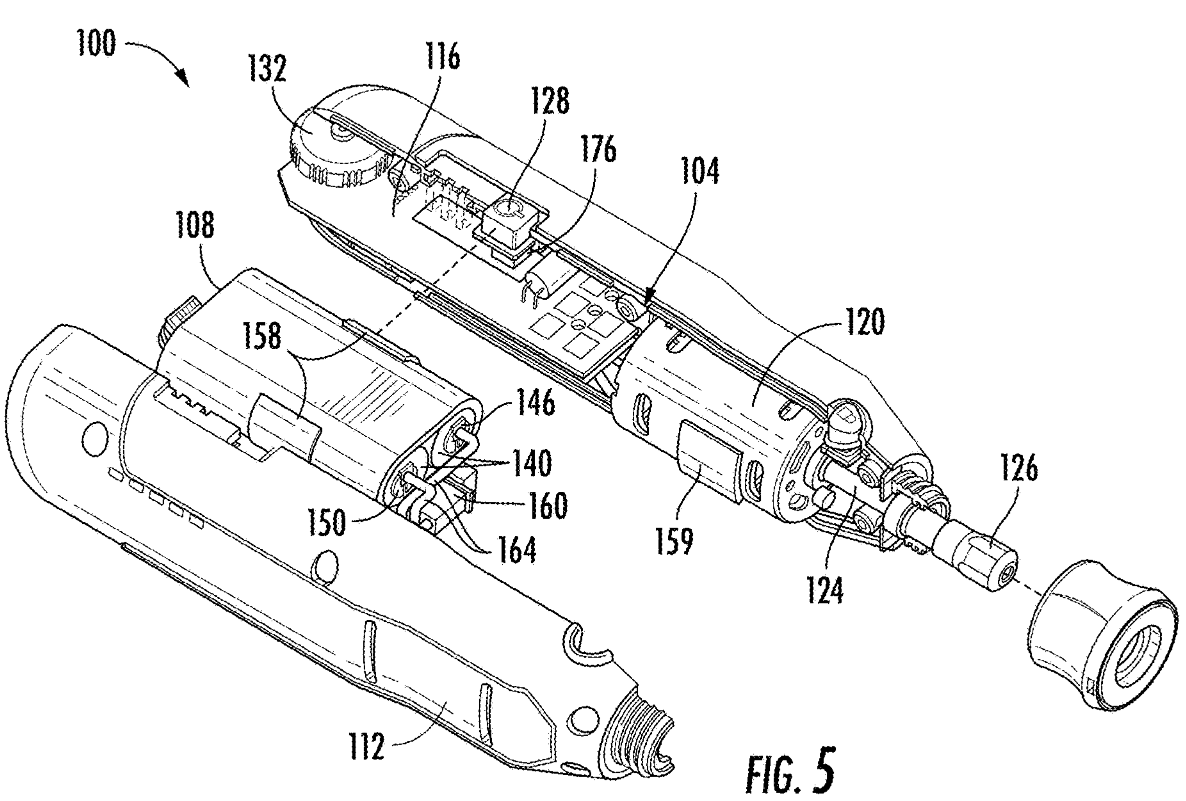
FIG. 5 is a partially exploded top perspective view of the electric device of FIG. 3.
Figure 6:
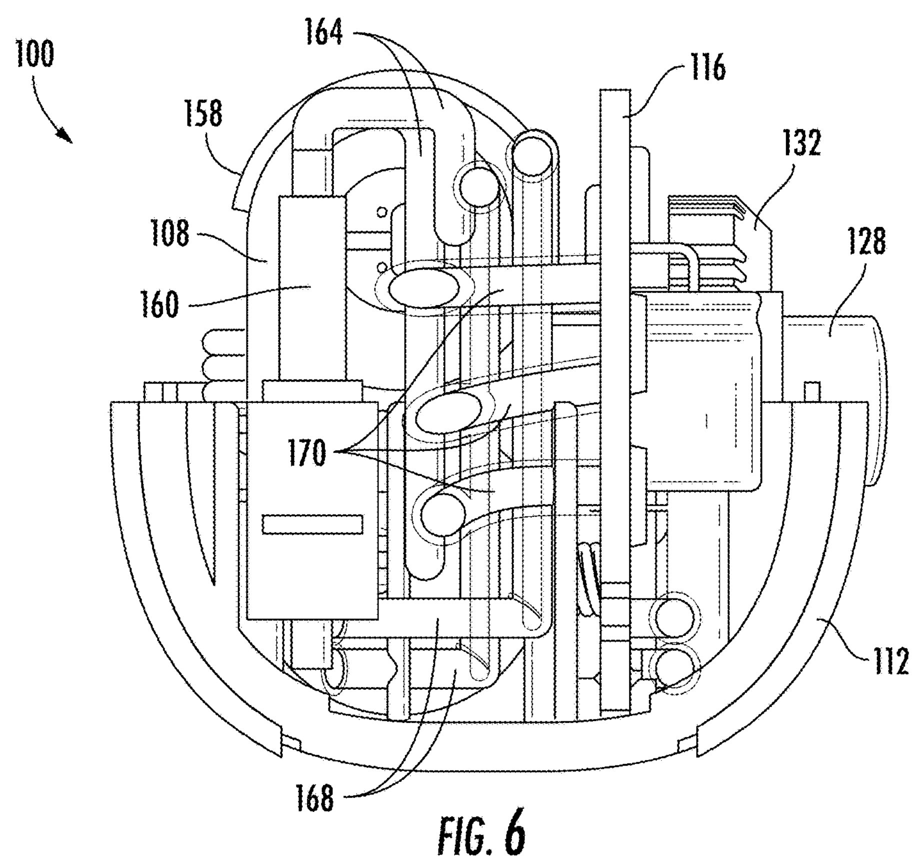
FIG. 6 is a cross-sectional partial cutaway front view of the electric device of FIG. 3.

Similarly, the motor 120 may also be mechanically decoupled from the housing 112. For example, as shown in FIGS. 3-5, at least one resilient member 159 is arranged between the motor and the housing 112 such that the resilient member 159, which may for example be a foam or rubber pad, damps the transfer of vibrations between the motor 120 and the housing 112.

Figure 9:
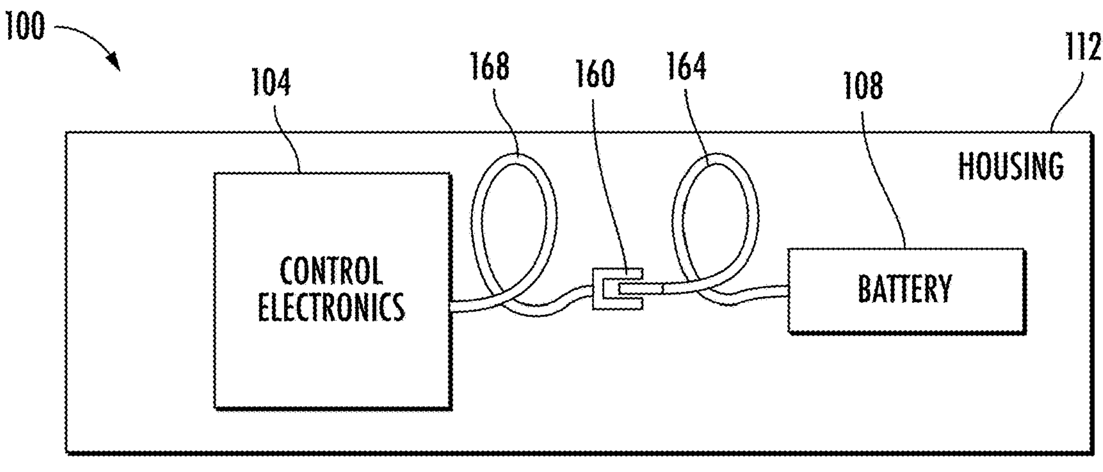
FIG. 9 is a schematic view of the electric device of FIG. 3.

With continuing reference to FIGS. 3-6, and further reference to FIG. 9, the battery 108, and in particular to one positive terminal 146 and one negative terminal 150, is permanently electrically coupled to at least one connector 160, and the at least one connector is also permanently electrically coupled to the electromechanical assembly 104. As used herein, permanently electrically coupled means the components cannot be electrically decoupled from one another without disassembling the housing of the tool and disassembling components that are not intended to be disassembled during normal use of the tool. As a result, of the electrical coupling, the at least one connector 160 forms an electrical connection between the battery 108 and the electromechanical assembly 104, and in particular the motor 120 and the circuit board 116.

In addition, the at least one connector 160 is mechanically decoupled from at least one of the battery 108 and the electromechanical assembly 104. In the illustrated embodiment, the at least one connector 160 is electrically connected to both the battery cells 140 of the battery 108 and the electromechanical assembly 104 via flexible wires 164, 168, respectively, but is mechanically decoupled from both the battery cells 140 and the electromechanical assembly 104 due the flexible wires 164, 168, which allow for relative movement between the at least one connector 160 and the battery cells 140, and between the at least one connector 160 and the electromechanical assembly 104. Put another way, the flexible wires 164, 168 are rigidly connected to the battery 108 and the electromechanical assembly 104, respectively, but the flexibility of the wires 164, 168 themselves enables relative motion between the connector 160 and both the battery 108 and the electromechanical assembly 104. There is, however, no frictional movement between the wires 164, 168 and their connections to the battery terminals 146, 150.

As noted above, the motor 120 and the battery 108 may both be mechanically decoupled from the housing 112. Thus, the motor 120 and the battery 108, at least on the scale of internal vibrations caused by normal operation of the electric device 100, move within the electric device 100 independently of one another and independently of the housing 112. Further, because of the relative motion provided by the mechanical decoupling of the flexible wires 164, 168 from one or both of the motor 120 and the battery 108, the flexible wires 164, 168 are not stressed where they connect to the battery side and electromechanical assembly side of the connector 160. Consequently, the tendency of the connection to degrade due to fretting is reduced or eliminated.

The motor 120 may also, in some embodiments, be connected to the circuit board 116 via flexible wires 170 to further facilitate mechanical decoupling of the motor 120 from the circuit board 116. Alternatively, in some embodiments, an additional connector similar to the connector 160 may be interposed between the motor 120 and the circuit board 116 to further facilitate mechanical decoupling the motor 120 from the circuit board 116.

Figure 10:
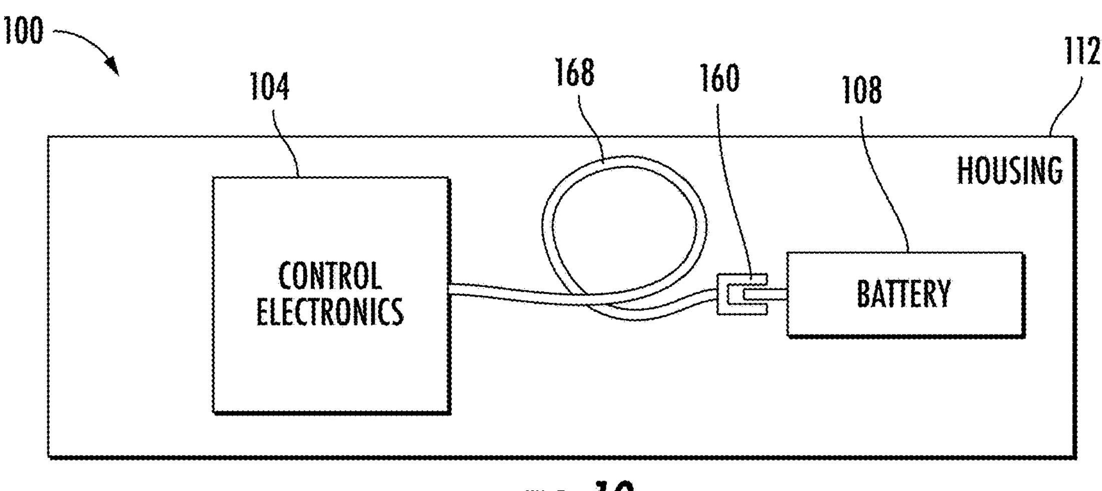
FIG. 10 is a schematic view of the electric device of FIG. 3.
Figure 11:
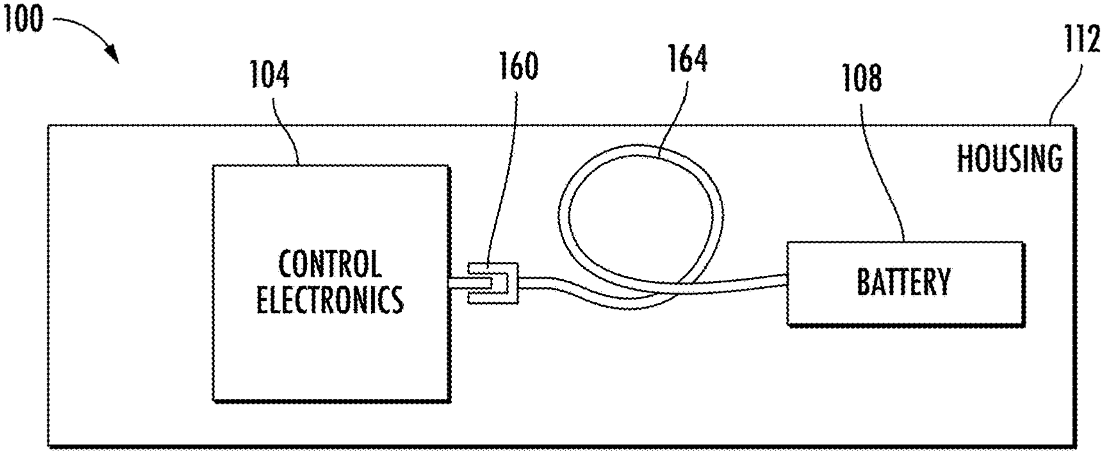
FIG. 11 is a schematic view of the electric device of FIG. 3.

As shown in FIGS. 9-11, the connector 160 may be mechanically coupled to neither the battery 108 nor the electromechanical assembly 104 (FIG. 9), or the connector 160 may be mechanically coupled to either the battery 108 (FIG. 10) or to the electromechanical assembly 104 (FIG. 11), in particular to either or both of the circuit board 116 and the motor 120, while being mechanically decoupled from the other of the electromechanical assembly 104 and the battery 108. The configurations of FIGS. 10 and 11 provide similar advantages as the embodiment of FIGS. 3-9, namely that the flexible wire 164, 168 compensates for any relative motion between the battery 108 and the electromechanical assembly 104 such that the fretting is reduced or eliminated at the connector 160. In all of the aforementioned configurations, the connection of the flexible wires 164, 168 and/or the connector 160 to the battery 108 and the electromechanical assembly 104 is a rigid connection such that the connection does not result in frictional movement between the components that could cause fretting.

As noted above, in the disclosed electric device 100, the tabless battery cell 140, has a greater current capacity than a conventional tabbed battery cell, allowing for a reduction in the number of cells 140 while still producing ample power to operate the electric device 100. Because the power loss in the internal wires and connections of the tool is proportional to the square of current, increased current capacity would ordinarily greatly increase the power loss within the system due to heat.

In an electric device having a removable battery, the battery must be positioned at a location where the user can easily access the battery to remove and replace it. As a result, design considerations usually result in the battery being positioned remote from the electronic components, for example at the end of the handle of a power drill or floor vacuum. Because of this, the current is often directed through a relatively long handle or extension, which results in power losses through the wires of the tool. In the disclosed electric device 100, however, the battery cells 140 are integral in and nonremovable from the housing 112. As such, the distance between the current carrying components such as, for example, the battery 108 to the electromechanical assembly 104, specifically to the motor 120 and/or to the circuit board 116, is short, resulting in reduced power loss through the electrical connections. In addition, because fewer battery cells 140 are necessary, the battery 108 has a reduced size, which also facilitates placement of the battery 108 in the housing 112 near the electromechanical assembly 104, thereby reducing the travel distance of the current.

Additionally, in conventional electric devices, relative movement between the terminals of the connections between the battery and the electromechanical assembly causes fretting at the connections over time. This fretting results in an increase in electrical resistance at the connection, which causes an increase in power loss at the connection. In the disclosed electric device 100, the flexible wires 164, 168 absorb relative movement between the battery 108 and the electromechanical assembly 104, which results in a reduced tendency of fretting at the connection 160. Thus, the electric device 100 further reduces power loss between the battery 108 and the electromechanical assembly 104.

In some embodiments, the connection 160 may include solid copper bus bars or bus bars formed of another highly conductive material such as, for example, aluminum, or an alloy of copper or aluminum. Additionally, to further reduce the current travel distance, the circuit board 116 may be arranged directly on the motor 120. In some embodiments, the circuit board 116 may also include battery weldments directly soldered into the circuit board, or directly welded onto the circuit board or motor. In some embodiments, the shortest distance between the battery 108, in particular at least one of the battery terminals 146, 150, and more particularly both a positive terminal and a negative terminal, to one or both of the circuit board 116 and the motor 120 is at most 30 mm, at most 20 mm, or at most 10 mm.

Within the electromechanical assembly 104, and particularly in the circuit board 116, the electrical current is directed through various switches, for example the MOSFET portion 176 of the power switch 128, before it arrives at the position at which the electrical current is converted into mechanical work. Conventional MOSFET switches are formed of silicon and, as the switch is switched between the on and off states, the switch passes through a "linear" mode, during which the overall resistance of the switching component is relatively high. In some embodiments of the electric device 100, the switches of the electromechanical assembly 104, and particularly in the circuit board 116, are silicon carbide or gallium nitride wafer switches. Compared to silicon, wafer switches of silicon carbide or gallium nitride allow for ultra-fast switching times, which reduces the time that the MOSFET is in the "linear" mode, thereby further reducing the overall resistance in the electrical circuit when the circuit is performing vital operations such as limiting current because of overload or under voltage.

The disclosed electric device 100 may be any desired battery operated electric device, for example, a power tool such as a rotary tool, a drill, grinder, saw, sander, etc.; a lawn tool such as a string trimmer, leaf blower, lawnmower, hedge trimmer, or the like; a cleaning device such as a vacuum or mop, or another electric device such as a flashlight or lantern, a beard trimmer or shaver, a cordless iron, a camping heater, or a battery-to-AC inverter.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:

1. An electric device comprising:

a housing;

an electromechanical assembly housed within the housing;

a battery arranged within the housing and comprising at least one tabless battery cell; and at least one connector that is electrically coupled to the electromechanical assembly and the battery so as to electrically connect the electromechanical assembly and the battery, wherein the at least one connector is mechanically decoupled from at least one of the electromechanical assembly and the battery.

2. The electric device of claim 1, wherein the battery is arranged integrally within the housing.

3. The electric device of claim 2, wherein the at least one connector is electrically coupled to and mechanically decoupled from the at least one of the electromechanical assembly and the battery via at least one first flexible wire.

4. The electric device of claim 3, wherein the electromechanical assembly includes a motor and a circuit board configured to control operation of the motor.

5. The electric device of claim 4, wherein the at least one connector is electrically coupled to the circuit board, and the circuit board is electrically coupled to the motor.

6. The electric device of claim 5, wherein the circuit board is electrically coupled to the motor via at least one second flexible wire.

7. The electric device of claim 6, wherein:

the battery is mechanically decoupled from the housing by at least one first resilient member, and the motor is mechanically decoupled from the housing by at least one second resilient member.

8. The electric device of claim 4, wherein the circuit board includes at least one silicon carbide or gallium nitride wafer switch.

9. The electric device of claim 1, wherein the at least one connector is mechanically coupled to the electromechanical assembly and mechanically decoupled from the battery.

10. The electric device of claim 1, wherein the at least one connector is mechanically coupled to the battery and mechanically decoupled from the electromechanical assembly.

11. The electric device of claim 1, wherein the at least one connector is mechanically decoupled from both the electromechanical assembly and the battery.

12. A power tool comprising:

a housing;

an output shaft configured to receive a working tool;

an electromechanical assembly housed within the housing, the electromechanical assembly including a motor configured to rotate the output shaft;

a battery arranged integrally within the housing and comprising at least one tabless battery cell; and at least one connector that is electrically coupled to the electromechanical assembly and the battery so as to electrically connect the electromechanical assembly and the battery, wherein the at least one connector is mechanically decoupled from at least one of the electromechanical assembly and the battery.

13. The power tool of claim 12, wherein the at least one connector is electrically coupled to and mechanically decoupled from the at least one of the electromechanical assembly and the battery via at least one first flexible wire.

14. The power tool of claim 13, wherein the electromechanical assembly further comprises a circuit board configured to control operation of the motor.

15. The power tool of claim 14, wherein the at least one connector is electrically coupled to the circuit board, and the circuit board is electrically coupled to the motor.

16. The power tool of claim 15, wherein the circuit board is electrically coupled to the motor via at least one second flexible wire.

17. The power tool of claim 16, wherein the battery is mechanically decoupled from the housing by at least one first resilient member.

18. The power tool of claim 17, wherein the motor is mechanically decoupled from the housing by at least one second resilient member.

19. The power tool of claim 14, wherein the circuit board includes at least one silicon carbide or gallium nitride wafer switch.

20. A rotary tool comprising:

an elongated housing having a longitudinal axis defined by a main extent direction of the elongated housing;

an output shaft configured to receive a working tool;

an electromechanical assembly housed within the housing, the electromechanical assembly including a motor configured to directly drive the output shaft in rotation, and a circuit board configured to control operation of the motor;

a battery arranged integrally within the housing and comprising at least one tabless battery cell; and at least one connector that is permanently electrically coupled to the electromechanical assembly and to the battery so as to electrically connect the electromechanical assembly and the battery, wherein the at least one connector is mechanically decoupled from at least one of the electromechanical assembly and the battery, and wherein the at least one connector is electrically coupled to and mechanically decoupled from the at least one of the electromechanical assembly and the battery via at least one first flexible wire.

* * * * *